Figure 1:
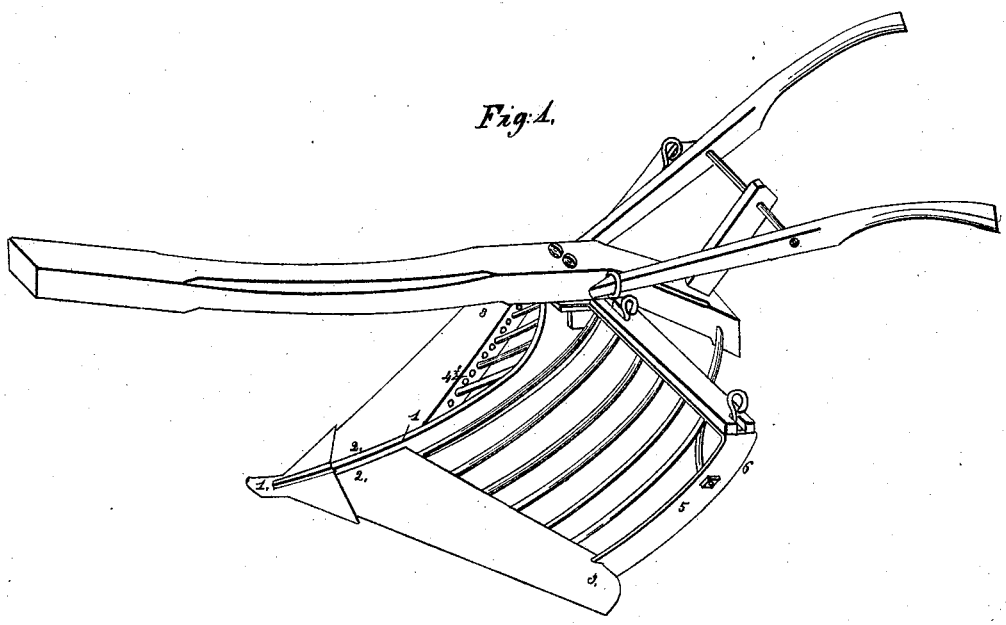
Figure 2:
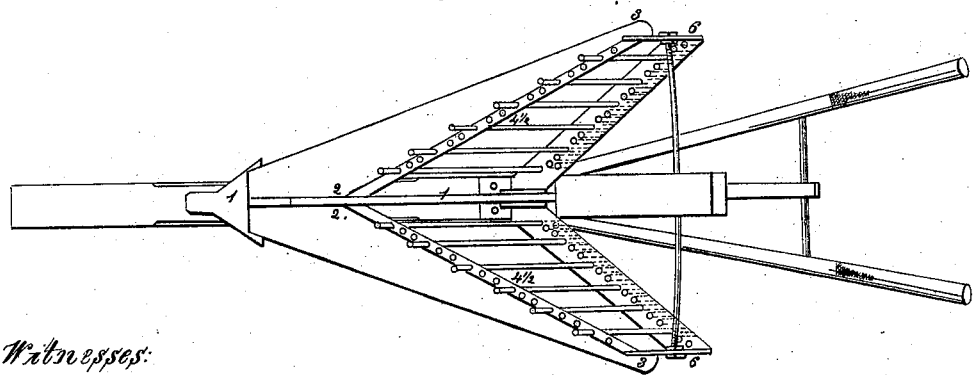

Munson & Lyon,
Potato Digger,

No. 34,519.    Patented Feb. 25, 1862.

Witnesses:
Octavius Knight
James M. Gridley

Inventors:
J. Munson
J. R. Lyon
Per O Munson
Atty

UNITED STATES PATENT OFFICE.

JEHIEL MUNSON, OF BURLINGTON, AND JOSHUA R. LYON, OF SHELBURNE, VERMONT.

IMPROVEMENT IN POTATO-DIGGERS.

Specification forming part of Letters Patent No. 34,519, dated February 25, 1862.

*To all whom it may concern:*

Be it known that we, JEHIEL MUNSON, of Burlington, in the county of Chittenden and State of Vermont, and JOSHUA R. LYON, of Shelburne, in the same county, have invented a new and useful Machine for Digging Potatoes, called the "Potato-Plow;" and we do hereby declare that the following is a full, clear, and exact description of the construction and operation of the same, reference being had to the annexed drawings, making a part of this specification, in which—

Figure A is a perspective view of the machine. Fig. B is a bottom view of the same.

Similar marks of reference indicate corresponding parts in both figures.

1 1 represent a center piece constituting a combined share and colter, and attached at its upper end to a beam of common construction.

2 3 2 3 are wings attached in front to the center piece, 1, and projecting obliquely backward and outward. On the upper edges of the wings flanges or lips 4½ are turned backward. The said flanges contain numerous holes to receive the lower ends of curved separating-rods 8. The upper ends of the said rods pass through correspondingly-perforated bars 9, attached at their inner ends to the center piece, 1, and connected at their outer ends, by standards 6, to the outer ends, 3, of the wings. The rods 8 are turned over at their upper ends so as to rest upon the bars 9, and are there held by clasps 10, secured to the bars 9 by suitable bolts, screws, or keys, so as to be removable at will. The said clasps may be constructed of either wood or metal, and are suitably grooved to fit over and hold the horizontal ends of the rods 8. The wings have their under sides in the same horizontal plane, and have their greatest elevation at their point of attachment to the center piece, 1, at 2, and gradually taper to their back ends at 3, thereby when the machine is in use bringing the highest part of the wings into contact with the greatest elevation in the row of potato-hills to be dug, and thus preventing the mass of earth and potatoes from passing through the spaces between the separating-rods above until sufficiently raised and agitated to fall through said spaces separately, and thereby also reducing the draft at the back ends of the wings 3 by presenting less surface for resistance, while at the same time the shallower earth at the sides of the hills of potatoes is sufficiently lifted and agitated to produce the intended effect, in connection with the separating rods and spaces, hereinafter described, of leaving the potatoes on the surface of the ground. These wings also diverge outward and backward from the point of attachment to the center piece, forming the two sides of a triangle of sufficient breadth to completely uplift the whole breadth of a row of potato-hills in once passing along it. The upward surfaces of these wings are made slightly concave, and therein coincide with the backward curvature of the separating-rods, and thereby make the draft more easy and obviate any danger of the potatoes being bruised or crushed in the process of being lifted from their beds.

The frame 6 8 rises from the back ends of the wings (bracing the same and forming the outer sides of the machine) to a height sufficient to prevent the earth from clogging against or overflowing the top thereof when in use, whence it returns in a line substantially parallel with the flange or lip on the upper sides of the wings, already described, and is attached to the center piece and draft-beam, thereby allowing each separating-rod to be used in any part of the flange or lip and frame, the required length being the same for the whole distance between the colter 1 and standards 6 6. The upright parts of the frame 6 are flat, with their greatest width parallel with the line of draft, in order to present the least resistance in draft. The top parts of the frame are also flat, but with the greatest width horizontal in order more conveniently to receive the numerous holes therein (corresponding with the holes in the flange or lip of the wings) for the holding and adjustment of the separating-rods. The separating-rods are all alike in size and construction, and are of sufficient numbers to graduate the spaces between them, when in place, to any desired distance. These rods are curved so as to incline backward, when in place, in a concave form in harmony with the surfaces of the wings, and they thereby move gradually, and check the loosened earth and potatoes thrown up by the wings, thus, in connection with the obliquely-receding line of rods, separating the earth from the potatoes and allowing the earth to fall evenly between the rods below the potatoes and the potatoes to fall upon the surface of such earth in rear of the machine. The lower ends of the rods are introduced into the holes in the flange or lip of the wings without any fastening; but the top ends of the same are made with a bent or angular head, which prevents them from slipping down out of place by resting on the top of the frame, while the separator-clasp, already described, holds them firmly in place, parallel with each other, from above. These rods may be made of square or flat metal as well as round.

The machine is operated by being propelled along the center of a row of potato-hills in the field, like a plow, and so adjusted by methods in common use as to lift and break up the earth by means of the wings and rods to any required depth, and the earth and potatoes thus sliding and rolling upward and backward and outward along the concave wings and rods, the earth falls over the wings between the rods spread evenly upon the flat ground behind, while the potatoes also fall through the spaces between the rods upon and into the thin coating of loose earth so lifted, pulverized, and thrown back, substantially as hereinbefore described, and at the same time the rake scatters any earth left at the sides and extracts the potatoes therefrom, substantially as aforesaid.

What we claim, and desire to secure by Letters Patent, is—

The arrangement of the adjustable separating-rods F, in combination with the perforated flange or lip 4½, the perforated frame D, and separator-clasp E, substantially in the manner and for the purpose specified.

JEHIEL MUSON.
JOSHUA R. LYON.

Witnesses:
  GEO. P. EDMUNDS,
  D. FRENCH.